US009729534B2

(12) United States Patent
Zhang et al.

(10) Patent No.: US 9,729,534 B2
(45) Date of Patent: Aug. 8, 2017

(54) IN SITU DEVICE AUTHENTICATION AND DIAGNOSTIC REPAIR IN A HOST ENVIRONMENT

(71) Applicant: Seagate Technology LLC, Cupertino, CA (US)

(72) Inventors: YiNan Zhang, Boulder, CO (US); David R. Kaiser, Apple Valley, MN (US); Wajahat Ali, Longmont, CO (US); Monty A. Forehand, Loveland, CO (US)

(73) Assignee: Seagate Technology LLC, Cupertino, CA (US)

( * ) Notice: Subject to any disclaimer, the term of this patent is extended or adjusted under 35 U.S.C. 154(b) by 169 days.

(21) Appl. No.: 14/632,243

(22) Filed: Feb. 26, 2015

(65) Prior Publication Data
US 2016/0255063 A1    Sep. 1, 2016

(51) Int. Cl.
| | |
|---|---|
| *H04L 29/06* | (2006.01) |
| *H04L 29/14* | (2006.01) |
| *G06F 11/07* | (2006.01) |
| *H04L 29/08* | (2006.01) |

(52) U.S. Cl.
CPC ............ *H04L 63/08* (2013.01); *G06F 11/079* (2013.01); *G06F 11/0727* (2013.01); *H04L 63/0428* (2013.01); *H04L 63/0876* (2013.01); *H04L 69/40* (2013.01); *H04L 67/1097* (2013.01)

(58) Field of Classification Search
None
See application file for complete search history.

(56) References Cited

U.S. PATENT DOCUMENTS

| | | | |
|---|---|---|---|
| 6,550,021 B1 | 4/2003 | Dalphy et al. | |
| 7,447,811 B2 | 11/2008 | Bita et al. | |
| 8,201,019 B2 | 6/2012 | Durica et al. | |
| 2004/0073654 A1* | 4/2004 | Sarma | G06F 11/2294 709/224 |
| 2004/0093225 A1* | 5/2004 | Bedner | G06Q 10/06 705/308 |

(Continued)

FOREIGN PATENT DOCUMENTS

EP    1933317 A1    6/2008

*Primary Examiner* — Dede Zecher
*Assistant Examiner* — Richard A McCoy
(74) *Attorney, Agent, or Firm* — Hall Estill Attorneys at Law (57) ABSTRACT

Apparatus and method for in situ authentication and diagnostic repair of a data storage device in a multi-device user environment. In accordance with some embodiments, the method includes detecting an error condition associated with a selected data storage device in the multi-device user environment. A first level of user authentication is established by providing a challenge value generated by the selected data storage device to a remote device over a network associated with the selected data storage device. A first diagnostic tool stored on the selected data storage device is executed responsive to receipt of the first level of user authentication. A second level of user authentication is established by providing a second challenge value generated by the selected data storage device to the remote device. An output from the first diagnostic tool is used to execute a second diagnostic tool stored on the selected data storage device.

19 Claims, 7 Drawing Sheets

(56) References Cited

U.S. PATENT DOCUMENTS

| | | | |
|---|---|---|---|
| 2005/0021974 A1* | 1/2005 | Anderson | G06F 11/006 713/178 |
| 2008/0104387 A1 | 5/2008 | Owhadi et al. | |
| 2008/0127325 A1* | 5/2008 | Ebrom | G06F 9/54 726/14 |
| 2008/0159539 A1* | 7/2008 | Huang | H04L 9/0866 380/277 |
| 2008/0276224 A1* | 11/2008 | Gyure | G06F 11/3688 717/126 |
| 2008/0287121 A1* | 11/2008 | Ebrom | D06F 39/005 455/426.1 |
| 2010/0064346 A1* | 3/2010 | Falk | H04W 12/06 726/3 |
| 2010/0102076 A1* | 4/2010 | Hendrickson | D06F 39/005 221/9 |
| 2010/0152924 A1* | 6/2010 | Pandit | G01C 23/00 701/3 |
| 2010/0169712 A1* | 7/2010 | Argue | G06F 11/079 714/25 |
| 2011/0200193 A1* | 8/2011 | Blitz | H04L 9/3271 380/277 |
| 2012/0192100 A1 | 7/2012 | Wang et al. | |
| 2013/0321853 A1* | 12/2013 | Lee | G03G 21/1882 358/1.14 |
| 2013/0332542 A1* | 12/2013 | Foo | G06F 13/385 709/206 |
| 2014/0136194 A1* | 5/2014 | Warford | G10L 17/02 704/233 |
| 2014/0325220 A1* | 10/2014 | Tunnell | G06F 21/00 713/168 |
| 2015/0121455 A1* | 4/2015 | Siegel | H04L 63/12 726/2 |
| 2015/0312240 A1* | 10/2015 | Fu | H04W 4/008 726/5 |
| 2015/0327069 A1* | 11/2015 | Fu | H04W 12/06 726/5 |
| 2016/0005049 A1* | 1/2016 | Menezes | G06Q 30/016 705/7.28 |
| 2016/0134778 A1* | 5/2016 | Tanaka | H04N 1/217 358/1.16 |
| 2016/0155476 A1* | 6/2016 | Fang | G07C 5/0891 348/231.1 |

\* cited by examiner

IN SITU DEVICE AUTHENTICATION AND DIAGNOSTIC REPAIR IN A HOST ENVIRONMENT

SUMMARY

Various embodiments of the present disclosure are generally directed to an apparatus and method for in situ authentication and diagnostic repair of a data storage device in a multi-device user environment.

In accordance with some embodiments, the method includes detecting an error condition associated with a selected data storage device in the multi-device user environment. A first level of user authentication is established by providing a challenge value generated by the selected data storage device to a remote device over a network associated with the selected data storage device. A first diagnostic tool stored on the selected data storage device is executed responsive to receipt of the first level of user authentication. A second level of user authentication is established by providing a second challenge value generated by the selected data storage device to the remote device. An output from the first diagnostic tool is used to execute a second diagnostic tool stored on the selected data storage device.

In accordance with other embodiments, the apparatus includes a multi-device data storage array comprising a plurality of data storage devices which cooperate to form a combined memory space. A host device directs data transfers with the multi-device data storage array. The host device has a controller with associated programming in memory adapted to detect an error condition associated with a selected data storage device in the multi-device data storage array, establish a first level of user authentication by providing a challenge value generated by the data storage device to a remote device over a network associated with the data storage device, execute a first diagnostic tool stored on the data storage device responsive to receipt of the first level of user authentication, and establish a second level of user authentication by providing a second challenge value generated by the storage device to the remote device and an output from the first diagnostic tool to execute a second diagnostic tool stored on the data storage device.

These and other features and advantages which may characterize various embodiments of the present disclosure can be understood in view of the following detailed discussion and the accompanying drawings.

DETAILED DESCRIPTION

Various embodiments of the present disclosure are generally directed to controlling access to protected functionality of a data storage device.

Data storage devices store and retrieve user data in a fast and efficient manner. Data storage devices can take a variety of forms, but all generally tend to include some amount of computer memory. The memory may take a variety of forms such as optical or magnetic rotatable recording media (e.g., optical or magnetic discs), solid-state semiconductor-based memory (e.g., flash memory, STRAM, RRAM, MRAM, PCRAM, FeRAM, DRAM, SRAM), etc.

These and other forms of storage devices are often provided with protected functionality. The protected functionality is not normally available to a user of the storage device, but is configured to be accessible by an authorized agent such as an authorized service technician, OEM manufacturing representative, etc.

Protected functionality can take a variety of forms, such as diagnostic routines, factory settings, specially configured data stored on the device, device firmware and associated control information, security information and components, etc. In some cases, the protected functionality may include functional access to various sectors, blocks or memory devices within the storage device, including those available for use in storing user data.

It is generally important to control access to these and other types of protected functionality to prevent inadvertent and/or malicious tampering with the device. For example, an attacking party who gains access to the protected functionality of a device may be able to copy, modify and/or destroy files, install malware or otherwise degrade or destroy the ability of the user to use the storage device. Similarly, the owner of the device may inadvertently change certain settings, parameters, control information, etc. and thereby affect the ability to gain access to the contents of the device.

Storage device manufacturers have implemented a number of credential systems in an effort to protect such device functionality. In such schemes, some sort of credential (authorization) information is presented to the storage device in order to gain access to the protected functionality under consideration. While generally operable, these types of systems have been met with limited success.

One approach generally involves using the same credentials for all members of a population of devices. While relatively simple to implement, if the credentials were to become publicly known, all of the devices using those credentials could become compromised. Another approach has involved assigning each device a unique credential. While more secure, this approach generally requires maintenance of a relatively large database at the manufacturer or other secure site. This can become unwieldy for manufacturers that manufacture hundreds of thousands, if not millions, of data storage devices each day.

Another problem with existing functionality access control systems is the need to gain access to a secure server in order to carry out the authentication process necessary to gain access to the protected functionality. Sometimes it becomes necessary for forensic or problem resolution reasons to attempt access to the protected functionality on devices that are in remote geophysical locations where secure network (e.g., wireless, Internet, etc.) communications are not reliable, or even available at all.

Still another problem with existing functionality access control systems relates to the serviceability of errors encountered in a customer (host) environment. As will be recognized, the repair and replacement of storage devices in a customer environment presents a number of challenges. It is relatively cumbersome and expensive to pull devices that indicate failure from a customer site and return the same, via a return material authorization (RMA) warranty processing system, for evaluation and replacement.

When a device failure is encountered at a customer site, steps that may be enacted under the current art can include sending an employee to the customer site to identify the problematic device; remove the device from the system without disturbing other devices, packaging and returning the failed device to the device manufacturer and waiting for feedback and other corrective actions from the manufacturer, including a replacement device. Each of these steps is costly from a customer standpoint.

Accordingly, various embodiments of the present disclosure are generally directed to in situ device authentication and diagnostic repair activities in a host (e.g., customer) environment. As explained below, some embodiments include detecting an error condition associated with a data storage device in a user environment; establishing a first level of user authentication by providing a challenge value generated by the data storage device to a remote device over a network associated with the data storage device; executing a first diagnostic tool stored on the data storage device responsive to receipt of the first level of user authentication; and establishing a second level of user authentication by providing a second challenge value generated by the storage device to the remote device and an output from the first diagnostic tool to execute a second diagnostic tool stored on the data storage device.

Further embodiments include different types and levels of diagnostic tools that can be unlocked and made available for use; the accumulation and passing of history log data to the remote device indicative of the user environment; ultimately repairing the device in situ or making the decision to remove and replace the device; a specialized symmetric key authentication process carried out by the customer; the availability of other more powerful symmetric key authentication channels for authorized agents of the device manufacturer, and so on.

In this way, the storage device can be quickly and efficiently evaluated in the existing customer environment. A device that can be repaired in situ need not be physically removed or replaced, and valuable feedback regarding real world environmental conditions can be communicated to the supplier of the device.

Figure 1:
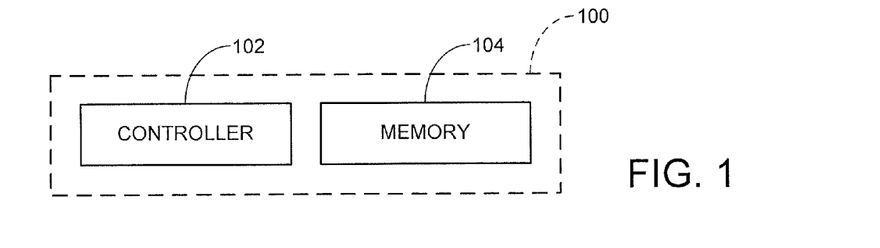
FIG. 1 provides a functional block representation of a data storage device in accordance with various embodiments of the present disclosure.

These and other features of various embodiments of the present disclosure can be understood beginning with a review of FIG. 1 which provides a functional block representation of an exemplary data storage device 100. The data storage device 100 is shown to include a controller 102 and a memory module 104.

The controller 102 provides top-level control of the device 100 and directs communications and data transfers with a host device (not separately shown in FIG. 1). The controller 102 may be realized in hardware, software and/or firmware. The memory module 104 can take a variety of forms, and includes one or more forms of data storage memory to store user data supplied by the host device.

Figure 2:
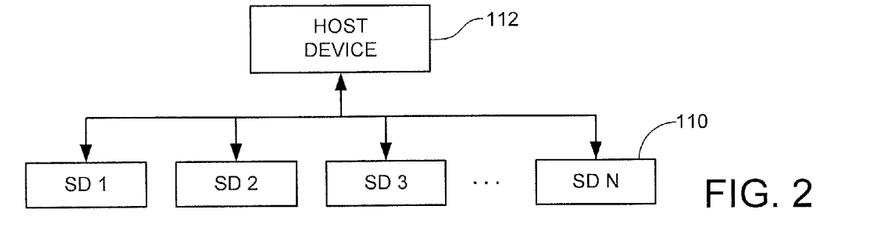
FIG. 2 shows a host environment in which multiple storage devices are used to provide a combined memory space.

FIG. 2 shows a host operational environment in which a plural number N storage devices 110 each nominally identical to the storage device 100 are grouped together to form a large memory space. A host device 112, such as a controller, server, etc. can interface with the storage devices. The operational environment can take a variety of configurations such as a multi-device cloud computing environment, a RAID (redundant array of inexpensive discs), a multi-device array (MDA), etc.

The storage devices 110 may be arranged within specially configured, multi-device storage enclosures (e.g., a JBOD—just a bunch of discs) which in turn are arranged into one or more storage racks or cabinets. For purposes of the present discussion, the host environment of FIG. 2 will be contemplated as comprising a customer environment in which a supplier of the storage devices 110 supplies the storage devices for use by the customer.

Figure 3:
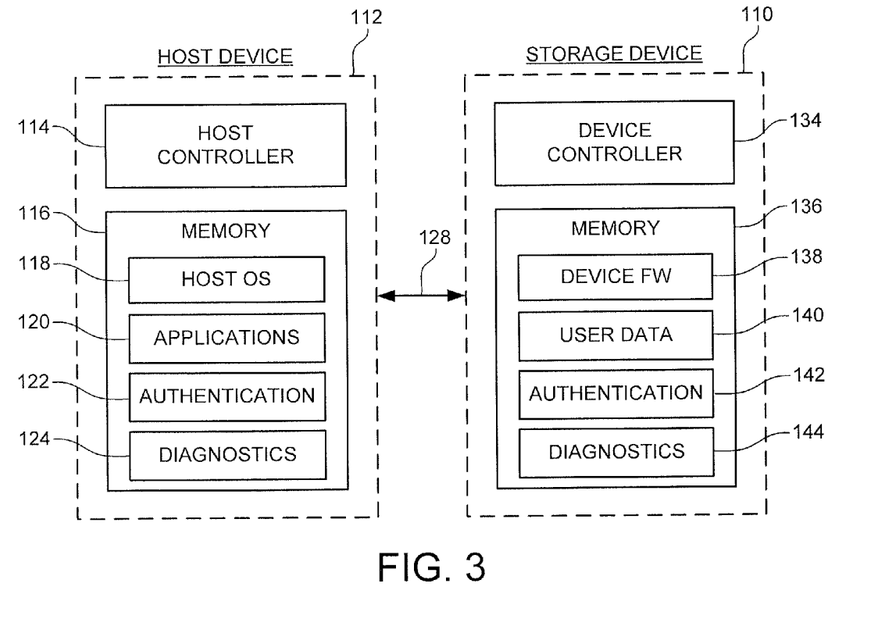
FIG. 3 is a functional block diagram of the host device and a selected storage device from FIG. 2 in accordance with some embodiments.

FIG. 3 shows a functional block representation of a selected storage device 110 and the host device 112 from FIG. 3 in some embodiments. The host device 112 is characterized as a personal computer or workstation type device with a host controller 114, which may take the form of one or more programmable processors and associated circuitry. A memory 116 stores a number of programming and data structures utilized by the controller 114, including a host operating system (OS) 118, one or more host application programs 120, an authentication module 122 and a diagnostics module 124. The memory 116 can take a variety of forms including one or more local volatile and/or non-volatile memory modules including DRAM, MRAM, flash, STRAM, rotatable disc memory (e.g., HDDs), optical drives, etc.

The host device 112 can include a number of other features and components including additional memory locations, communication ports, a user interface (I/F), switches, power supplies, fans, etc. The host device 112 communicates with the storage device 110 via a suitable interface 126, such as a serial attached small computer system interface (SAS) interface, an Ethernet interface, etc.

The storage device 110 similarly includes a device controller 134 which may take the form of a hardware or programmable processor and associated circuitry. A device memory 136 stores a number of computer objects including device firmware (FW) 138, user data 140, an authentication module 142 and a diagnostics module 144. As with the host device 112, the memory 134 of the storage device 110 can take a variety of forms including one or more local volatile and/or non-volatile memory modules including DRAM, MRAM, flash, STRAM, rotatable disc memory (e.g., HDDs), optical drives, etc.

Figure 4:
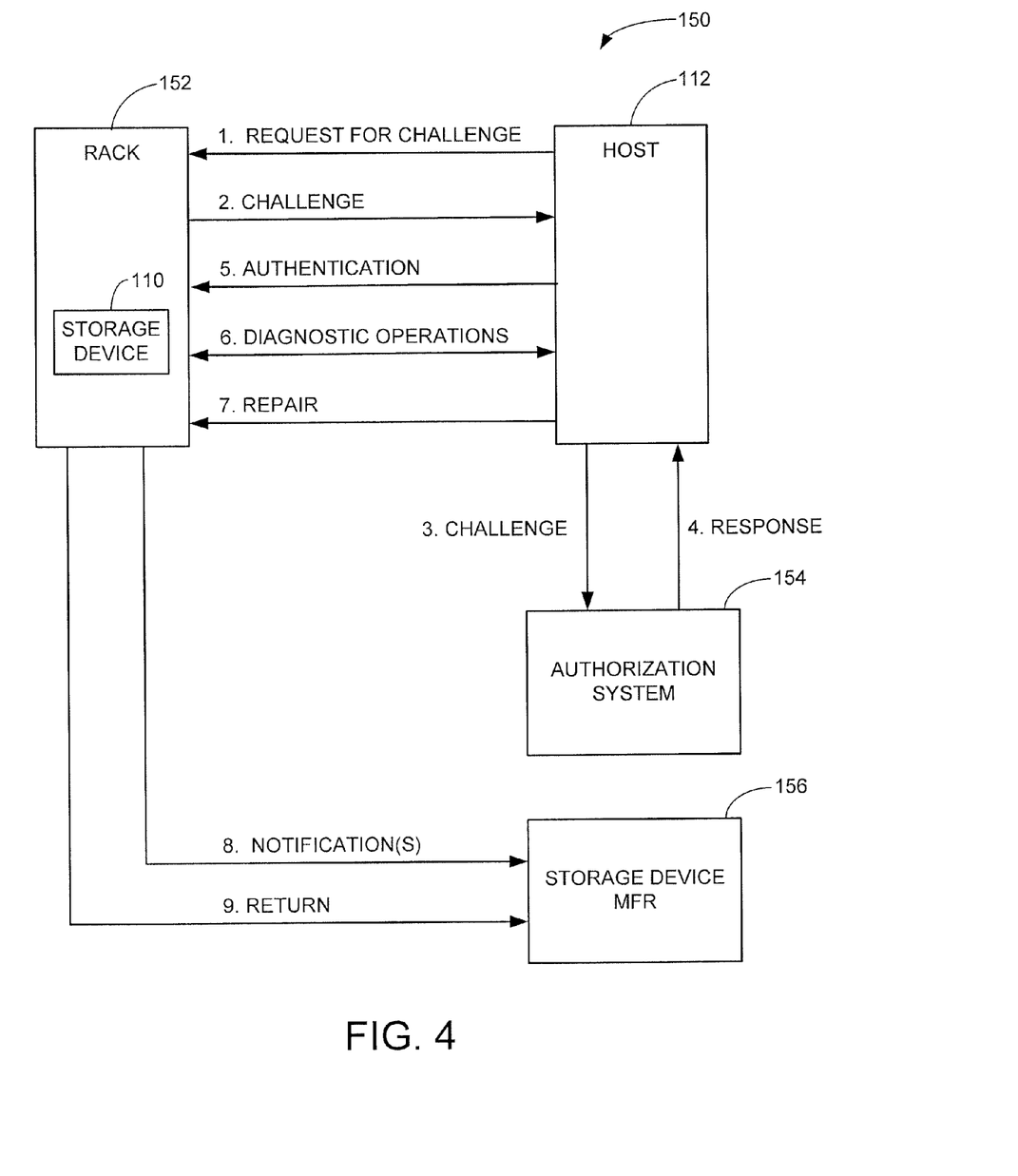
FIG. 4 is a functional sequence of authentication and diagnostics steps carried out by the system of FIG. 2.

FIG. 4 illustrates an authentication and repair processing system 150 used in the exemplary customer environment of FIGS. 2-3 in accordance with some embodiments. The system operates to facilitate in situ authentication and diagnostic repair of the storage device 110, as explained below.

The storage device 110 is housed within a multi-device rack 152 and operates under the control of the host device 112. A remote authorization system 154 may take the form of a remote server or other mechanism that can communicate with the host device 112 over a suitable network, such as the Internet. The manufacturer of the storage device(s) 110 is represented by block 156. While it is contemplated that the authorization system 154 is under the control of the device manufacturer 156, separate communications and material transfers may take place with the manufacturer, and so separate process flow pathways are illustrated for this purpose.

FIG. 4 depicts a number of steps or processes, identified as operations 1 through 9, carried out responsive to the detection of an error condition with a selected storage device. It will be appreciated that these operations are merely exemplary and are not limiting, as the various steps represented in FIG. 4 can be omitted, modified, appended and/or performed in a different order depending on the requirements of a given application. The various operations are carried out automatically in accordance with the programming set forth in the respective authentication and diagnostic modules 122/124 and 142/144 of FIG. 3. These various operations will be discussed in greater detail below.

While not expressly denoted in FIG. 4, the operational sequence begins in response to the detection of an error condition associated with a selected storage device 110. The type and style of error condition can vary, including a reported read error, a reported write error, indications from self-monitoring diagnostics at the device level or at the host level with regard to bit error rate (BER) performance, temperature, response time, aging, etc. A specific indicator or code may or may not be associated with the error condition; if so, this information may influence the particular diagnostics that are subsequently applied to the device.

Apart from the processing represented in FIG. 4, the system 150 may take other steps to temporarily address and mitigate the error condition. For example, in a RAID environment, the storage device 110 with which the error condition is associated (hereinafter "failed device") may be taken off line and out of continued service until the error condition can be resolved. The contents of the failed device may be retrieved from that device itself or may be rebuilt from other storage devices in the RAID set. One or more replacement (spare) storage devices may be activated to take the place of the failed device so that continued operation takes place in the customer environment. It will be noted that the failed device 110 remains in place and is not physically disconnected or otherwise removed from the rack 152 at this time.

The diagnostic system proceeds to gain authorization to enact various diagnostic tools to assess the error condition in the failed device. To this end, the embodiment of FIG. 4 shows a first operation ("operation no. 1") as a request issued by the host device 112 to the failed device 110 for a challenge value. As explained below, a challenge value is a specially encoded value used to facilitate access to the diagnostic tools.

In response to the request for the challenge value, the controller 134 of the failed device 110 (see FIG. 3) activates the authentication module 142 to generate and output the requested challenge value to the host device (operation no. 2). It is contemplated that the challenge value will be a multi-bit random sequence of selected length, such as but not limited to 32 bytes, 64 bytes, 128 bytes, etc. Other sizes and forms of challenge values can be used. Encryption or other cryptographic processing (e.g., a hash, etc.) may be applied to the challenge value.

The host 112 establishes a connection with the remote authorization system 154 and transmits the challenge value thereto (operation no. 3). The authorization system 154 processes the received challenge value to produce a response that is returned to the requesting host 112 (operation no. 4). As explained below, the response may take the form of an encrypted challenge value through the application of selected cryptographic processing to the received challenge value.

The host forwards the response to the storage device 110, which processes the response to authenticate the host and the authorization system. As explained below the storage device may operate to decrypt the received encrypted challenge value and compare the decrypted challenge value to the originally generated challenge value to authenticate the operation (operation no. 5).

Once authenticated, the host device 112 proceeds to enact one or more diagnostic tools to evaluate the storage device 110 (operation no. 6). In some cases, a hierarchy of diagnostic tools is applied in a selected sequence based on the results of each previously applied tool. As explained below, further authentication steps may be carried out to unlock higher levels of tools.

As possible, one or more repair operations may be applied to the storage device 110 as a result of the application of the diagnostic tools (operation no. 7). If the storage device 110 is successfully repaired, no further actions are taken with respect to the device and the device is returned to service in the customer environment. Notifications of the operations, including test data and results, may be transmitted to the storage device manufacturer (operation no. 8).

In the event that the failed device 110 cannot be repaired, the device is returned to the storage device manufacturer 156 (operation no. 9) for replacement. Even if the device ultimately requires replacement, it will be appreciated that the system 150 provides a wealth of information regarding the customer environment and conditions associated with the failure, enhancing the ability to resolve the error and initiate a suitable corrective action sequence to reduce future error conditions.

Figure 5:
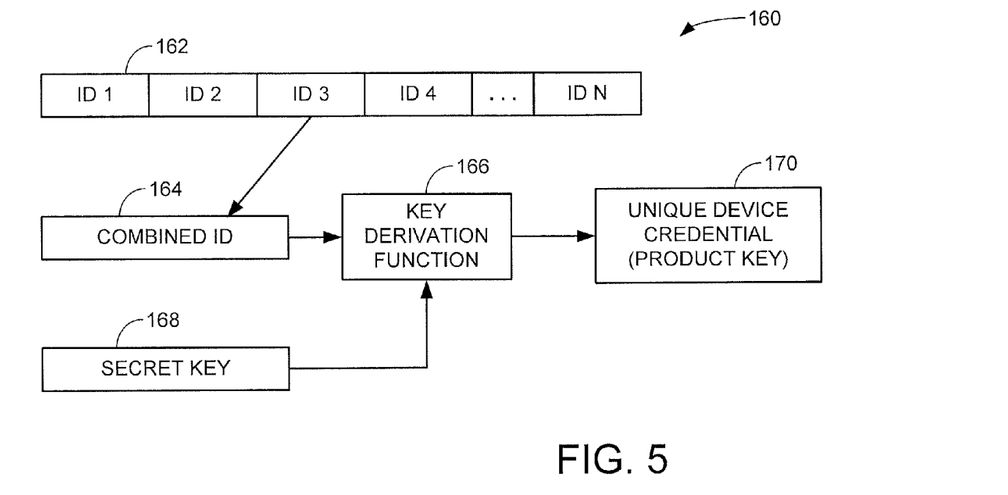
FIG. 5 shows processing circuitry used during an authentication routine carried out in accordance with some embodiments to generate a unique device credential.

FIG. 5 provides a functional block diagram of a control circuit 160 that can be used to support the challenge value authentication of FIG. 4. The control circuit 160 can be resident in one or more physical devices, including a host device coupled to the data storage device during manufacturing processing by the device manufacturer 156 (FIG. 4). The processing of FIG. 5 generates a unique device credential as a device specific identifier (ID) value associated with the storage device. Such credential is not necessarily required but is useful in accordance with some embodiments.

A number of identification (ID) values are collected from the data storage device under evaluation. These ID values are numerically designated at 162 and denoted as ID 1-N. The ID values 162 are concatenated in a selected order to form a combined ID value 164. Other combinatorial operations can be supplied to the ID values 162 to form the combined ID value 164 so long as the combinatorial operation(s) can be repeated later as explained below.

The ID values 162 can take any suitable form or forms. In some cases, the ID values can comprise device specific values such as device serial numbers, component level serial numbers (e.g., spindle motor values, preamp values, etc.), capacity, model names and/or numbers, date code information, parametric data obtained during device qualification, etc. The ID values may be electronically stored within the storage device and/or obtainable from the device through human visual or machine readable inspection by being printed on an exterior housing member, label, component and/or printed circuit board of the device. Because of the in situ nature of the system of FIG. 4, it is contemplated albeit not necessarily required that all of the ID values are stored internally within the storage device in a suitable local memory and are transmittable from the storage device upon request.

The combined ID value 164 is stored in a local memory and presented to an encryption engine 166 which, responsive to an input secret symmetric encryption key 168, performs a selected encryption operation characterized as a key derivation function (KDF). This generates a unique device credential 170 will be a multi-bit string of digital values having an apparent random appearance. The unique device credential 170, also referred to herein as a product key, is temporarily stored in a local memory pending transfer to the storage device 110.

Any number of suitable encryption algorithms can be used by the engine 166. Steps are taken to maintain the secret key 168 as confidential, such as through strict controls at the device manufacturer 156 used to produce the data storage device 110.

Figure 6:
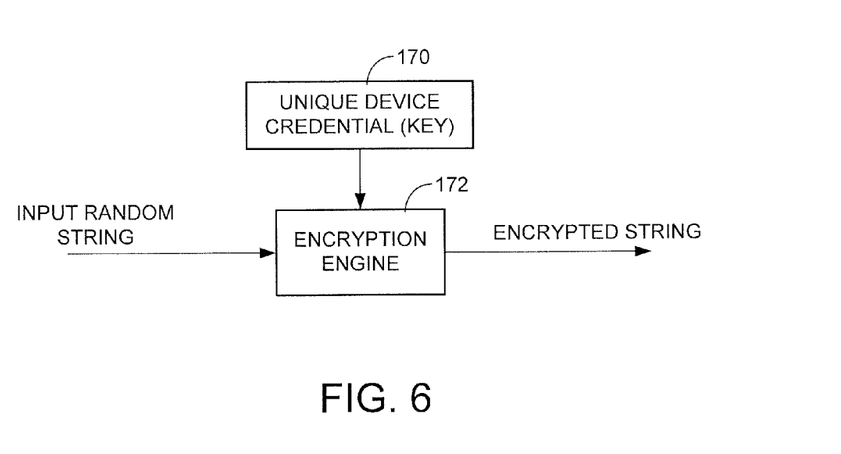
FIG. 6 illustrates the use of the unique device credential from FIG. 5 as an encryption key to encrypt input data.

The unique device credential 170 can thereafter be used as an input to a cryptographic process, as generally shown in FIG. 6. The cryptographic process in FIG. 6 is an encryption algorithm of a second encryption engine 172, and the unique device credential 170 is used as a symmetric encryption key for the engine 172. The encryption engine 172 may be the same as, or different from, the encryption engine 166 of FIG. 5. The engine 172 transforms an input random string, which may be in the form of plaintext or previously encrypted ciphertext, into an encrypted (ciphertext) output.

Figure 7:
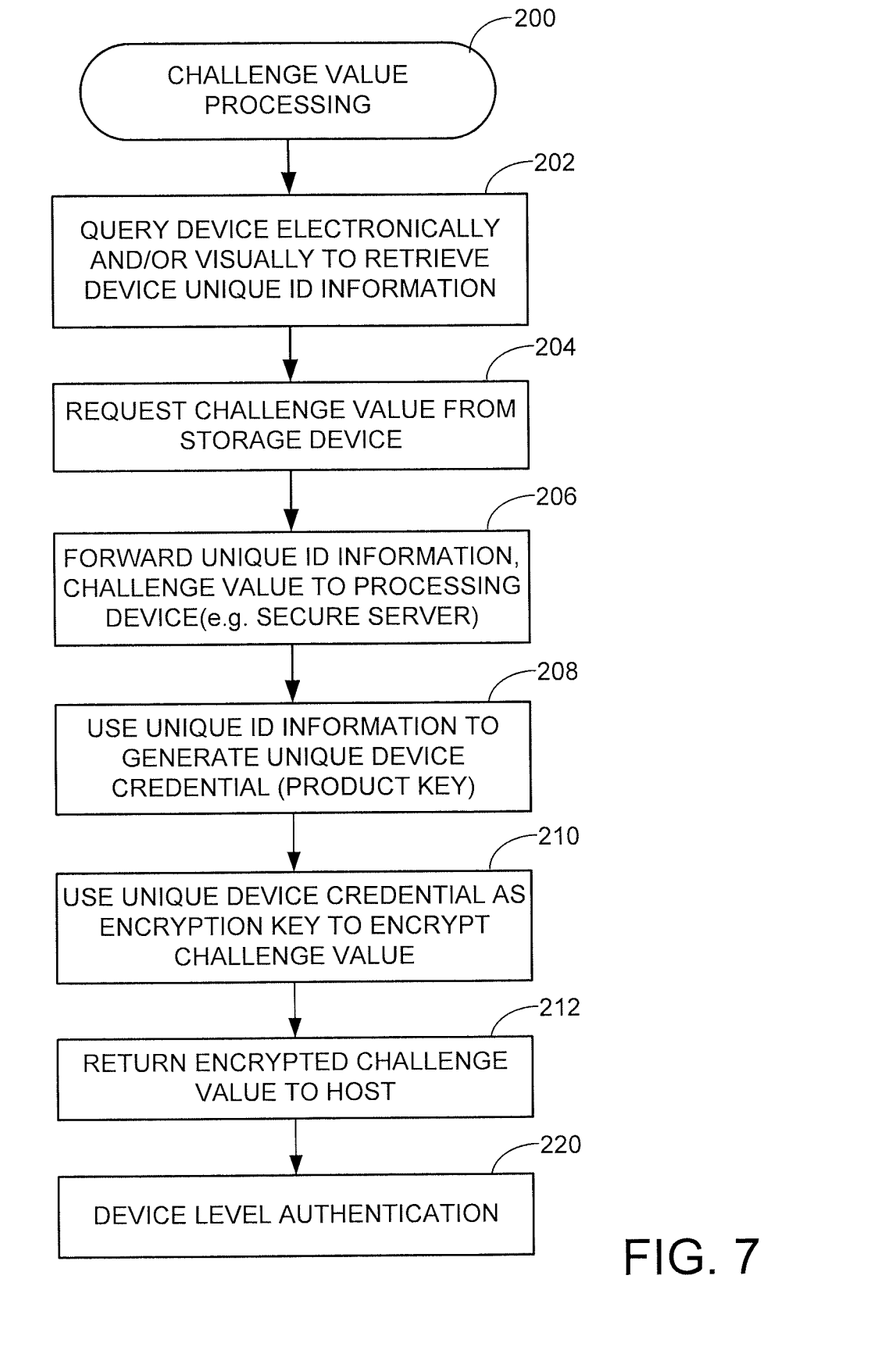
FIG. 7 is a flow chart for an authentication routine in accordance with FIGS. 4-6.

FIG. 7 shows a challenge value processing routine 200 to illustrate steps that can be carried out during the challenge value authentication of FIG. 4. Other processes can be used including processes that do not include the use of the ID values 162 of FIGS. 5-6. At step 202, the failed device 110 can be queried electronically and/or visually to retrieve the various unique ID values 162.

At step 204, a challenge value is requested from the storage device. In some cases, a combined request can be issued by the host device 112 so that the storage device 110 returns both the ID values and the challenge value. The storage device 110 forwards the challenge value (and the ID values as required) to the host device 112 in response to the request.

In some embodiments, the storage device 100 may be provided with one or more challenge values that have been precalculated and stored in a suitable memory location of the device, so that the request for a challenge value results in the outputting of the next available value from the device. Alternatively, the storage device 100 can be configured to generate a suitable challenge value on-the-fly responsive to the request from the agent device.

The challenge value can take any suitable form, but will be understood as comprising a multi-bit logical sequence of selected length. A random number generator or other circuitry, including circuitry that uses seed values, entropy values, etc. can be used to output the challenge value.

The host device 112 proceeds to supply the ID values and the challenge value to the authentication system 154 at step 206, as discussed above in FIG. 4. The authentication system includes a processing block that includes one or more encryption systems as set forth by FIGS. 5-6, and has access to the secret key 168.

At step 208, the processing block uses the received ID values to recreate the unique device credential (see FIG. 5). At step 210, the processing block uses the unique device credential to encrypt the challenge value (see FIG. 6). This produces an encrypted challenge value which is returned to the host device 112 at step 212. It will be appreciated that the secret key (168, FIG. 5) and the encryption processing are maintained within the processing block so as to be unavailable to an unauthorized attacking party.

Figure 8:
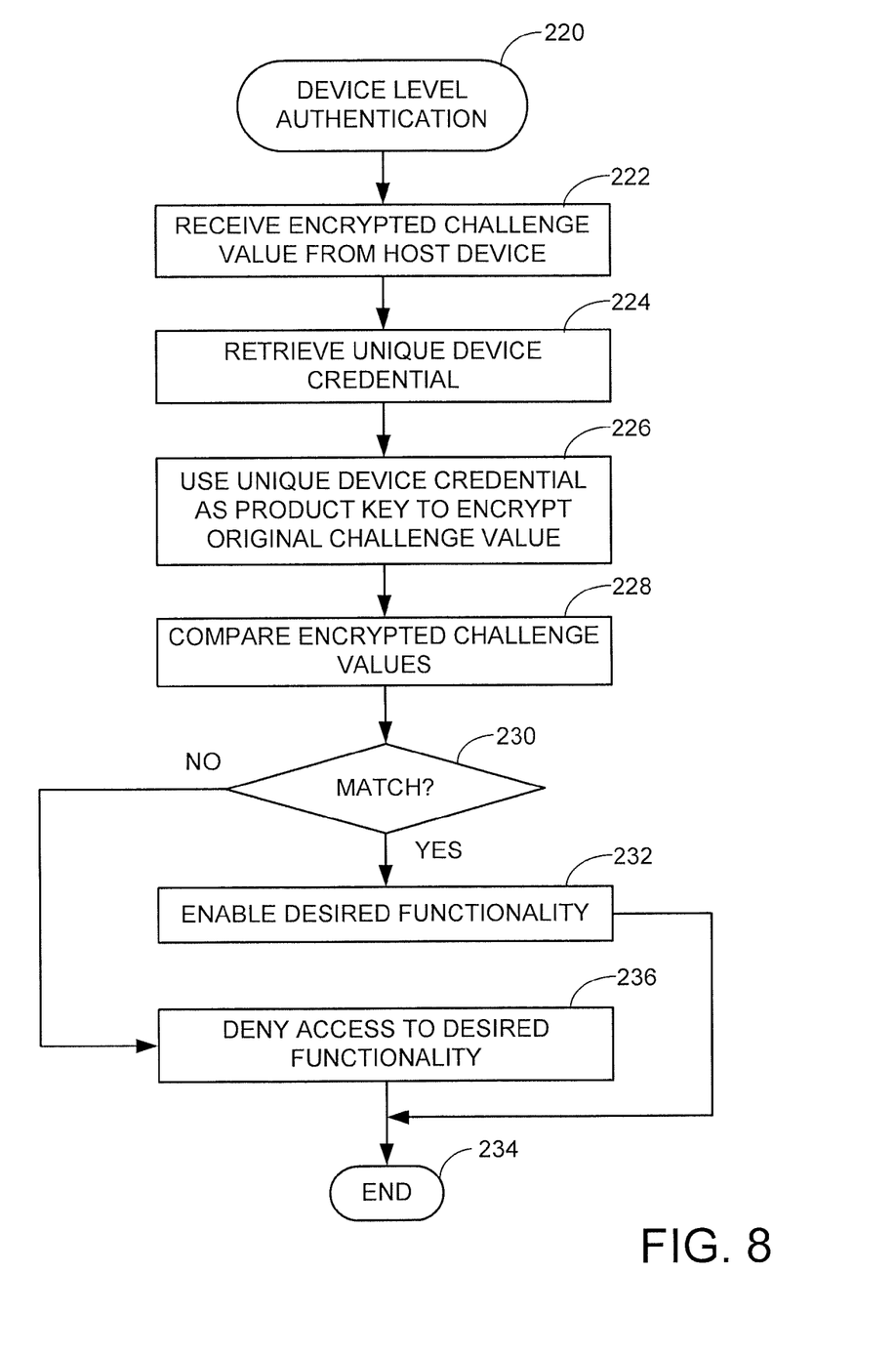
FIG. 8 is a flow chart for a device level authentication routine in accordance with the routine of FIG. 7.

Device level authentication takes place at step 220 using the encrypted challenge value, as now discussed in FIG. 8. It will be appreciated that the steps in FIG. 8 are carried out by the device controller 134 in conjunction with the authentication module 142 (see FIG. 3).

The encrypted challenge value is received by the failed device 110 at step 222, and the previously stored unique device credential is retrieved from the memory 136 at step 224. These elements are used at step 226 so that the unique device credential operates as a symmetric encryption key upon the originally issued challenge value to produce a second encrypted challenge value. The second encrypted challenge value is thereafter compared to the encrypted challenge value received from the agent device at step 222.

Alternatively, the unique device credential can be used to decrypt the received encrypted challenge value to produce a recovered challenge value which is compared to the originally issued challenge value. Regardless, a comparison is made at step 228 and if a match is obtained at decision step 230, the device proceeds to unlock the desired diagnostic tool functionality at step 232, and the process ends at step 234. Alternatively, if a mis-match occurs, the routine passes from step 230 to step 234 where access is denied.

A variety of alternatives and additional considerations will readily occur to the skilled artisan in view of the present disclosure. Error detection codes (EDC) such as in the form of parity, checksums, Reed Solomon error correction codes (ECC), etc. can be used during the various data transmissions to ensure data bit integrity.

While characterized as in situ customer environment diagnostic tools, it will be appreciated that the protected functionality used during such evaluation can be substantially any desired functionality of the device including diagnostic routines, access to special secret data, ability to modify settings, install new firmware code, access to specific areas of the media including hidden folders, sectors, volumes, etc. The functionality access operations can form part of a bootstrap routine in which the device is initialized and enters a mode where the device can respond to the various inputs discussed herein. Alternatively, the authentication and diagnostic evaluation can be wholly automated without need for any physical access to the failed device.

Figure 9:
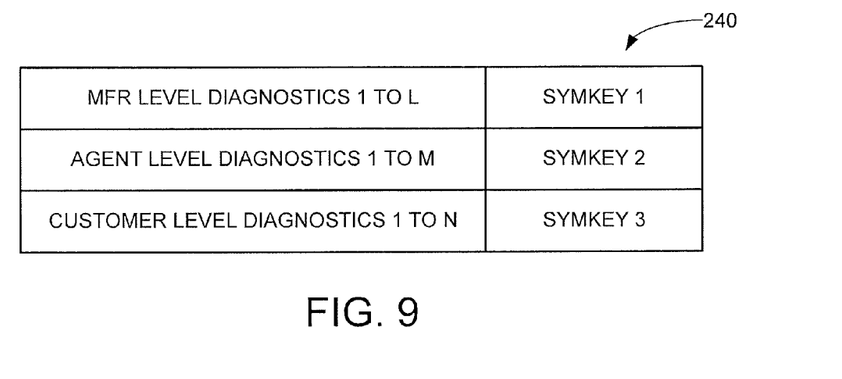
FIG. 9 is a data structure showing various diagnostic routines and corresponding symmetric authentication cryptographic keys (symkeys).

FIG. 9 shows a data structure 240 that constitutes different hierarchies of diagnostic routines that may be resident and available for use during evaluation of the failed device 110. A first level is referred to as manufacturer (MFR) level diagnostics, from level 1 to level L. Authorized agent diagnostics are provided from 1 to M, and customer level diagnostics are available from 1 to N. The various diagnostics can be the same routines or different routines. It is contemplated that the manufacturer level diagnostics are the most extensive set of diagnostics since these are made available to and used during device manufacturing and certification. The agent diagnostics may comprise a limited subset of these routines, or additional routines, available to authorized agents such as manufacturing representatives who perform on site or in house evaluation of a failed device. The customer level diagnostics may be a further subset of such diagnostics and are specifically used for in situ evaluation of the failed device at the customer site.

The various routines can take any number of forms depending on the requirements of a given application. For example, if the failed device 110 is a hard disc drive, then suitable diagnostics relating to data transducer interaction with rotatable media may be included, such as fly height tests, servo qualification and evaluation, write and read tests, BER tests, etc. In a solid state drive (SSD) environment, different read and write threshold tests, data migration and evaluation tests, etc. may be employed. The various routines can be stored locally on the storage device and a corresponding command list can be applied to the host device so that, during such testing, test scripts or other commands can be issued and used to enable the device to be evaluated. In other cases, specially configured stress patterns or other commands may be resident in the host device and transferred to the device. It is contemplated that substantially any available test that uses a host device can be incorporated into the customer level diagnostics package.

Each of the diagnostic sets is shown to have a corresponding symmetric key (symkey 1 through 3). These different keys allow different authentication channels to be established, thereby unlocking the associated functionality of each diagnostic set.

Figure 10:
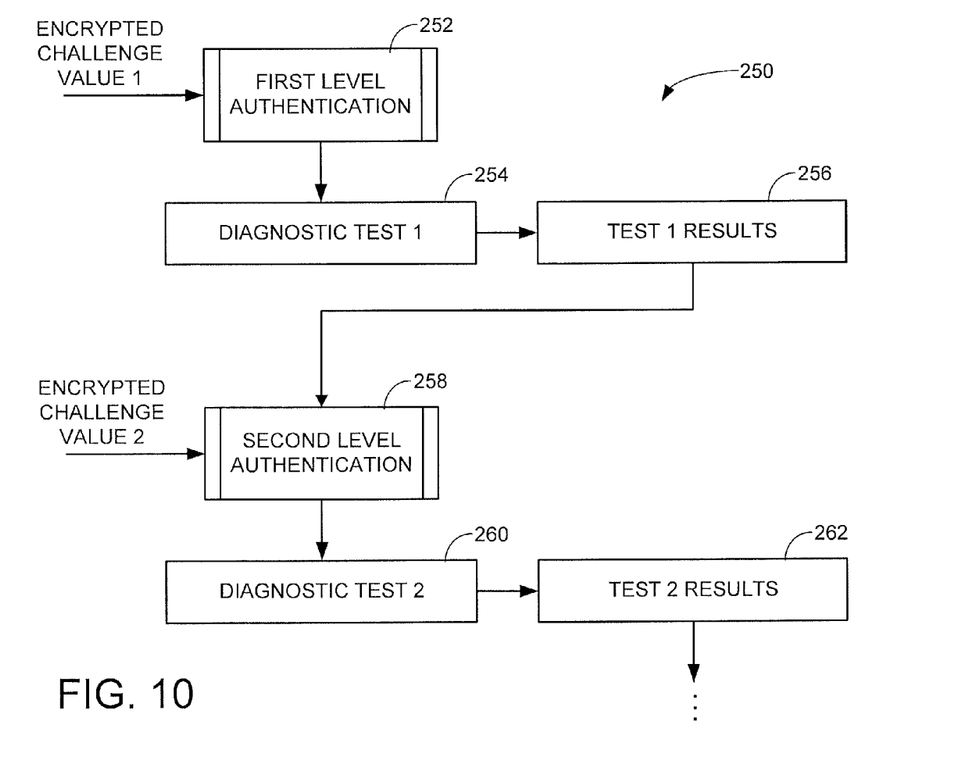
FIG. 10 is a process flow showing different levels of diagnostics being unlocked based on prior diagnostic test results in accordance with some embodiments.

FIG. 10 is a flow sequence 250 to illustrate one approach that can be used during the diagnostic testing of FIG. 4. In the sequence 250, a first level authentication operation 252 is carried out as described above to unlock a first, lower level of diagnostic testing (diagnostic test 1) 254. The operation of this diagnostic testing results in a first set of test results (test 1 results) 256.

A second level of authentication 258 is thereafter applied to unlock further levels of diagnostic testing. This second level authentication can use a second encrypted challenge value as well as some or all of the test results 256 from the first level of diagnostic testing. Upon passing the second level authentication, a second level of diagnostics (diagnostic test 2) 260 is carried out which produces a second set of test results (test 2 results) 262. Such processing can continue with additional levels of authentication to enable more complex, and more protected, levels of functionality. This can help to ensure that greater levels of protected functionality are not accessed until needed and are not accessed unless lower levels of diagnostics have been completed. In some cases, the previous level of diagnostics will dictate which subsequent level of diagnostics should be applied.

Figure 11:
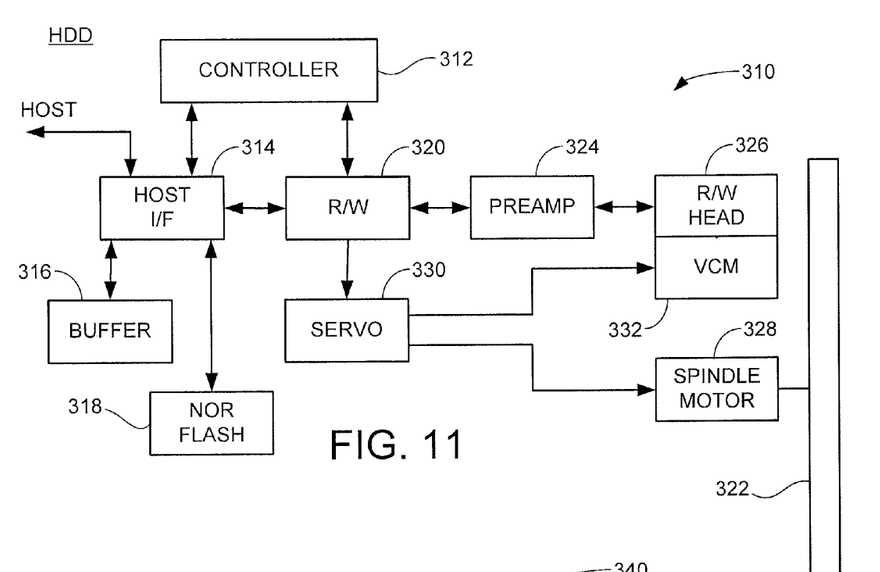
FIG. 11 shows a functional block representation of the storage device of FIG. 1 characterized as a hard disc drive (HDD).

FIG. 11 depicts a failed device 310 evaluated as discussed above. The failed device 310 is characterized as a hard disc drive (HDD) or hybrid HDD. The discussion of FIG. 11 sets forth various types of diagnostic testing that may be applied in accordance with the foregoing discussion.

The HDD 310 in FIG. 11 includes a hardware or firmware/software based controller 312 to provide top level control for the HDD. A host interface (I/F) 314 communicates commands, status information and user data during transfer operations between the HDD 110 and the host using a suitable interface protocol (such as Ethernet, SAS/SATA, etc.). A volatile and/or non-volatile buffer memory 316 facilitates the temporary storage of data, parameters and programming for use during such operations. Local memory in the form of NOR flash 318 can be provided to store certain control parameters used by the HDD 110, such as the unique combined credential, the various ID values, the secret key, etc.

A read/write (R/W) channel 320 conditions write data supplied by the host for writing to rotatable magnetic recording media 322, and performs signal processing on recovered data signals during a read operation to reconstruct previously stored data. A preamplifier/driver (preamp) 324 supplies write currents, read bias currents and signal conditioning as required to one or more read/write (R/W) heads 326. The heads 326 are supported adjacent the data recording surfaces of the media 322 by air currents established by high speed rotation of the media via a spindle motor 328.

A closed loop servo positioning control circuit 330 obtains demodulated servo positioning information from the channel 320 and supplies control inputs to the spindle motor 328 and to a voice coil motor (VCM) 332. The VCM 332 pivots an actuator used to support the heads 126 to position the heads adjacent data tracks (not separately shown) defined on the media surfaces.

It can now be seen that substantially any suitable diagnostic testing and routines can be incorporated to evaluate the various electrical and electromechanical systems represented in FIG. 11, including but not limited to fly height tests for the head, read/write operations, preamp adjustments, channel adjustments, requalification of various parameters, etc.

Figure 12:
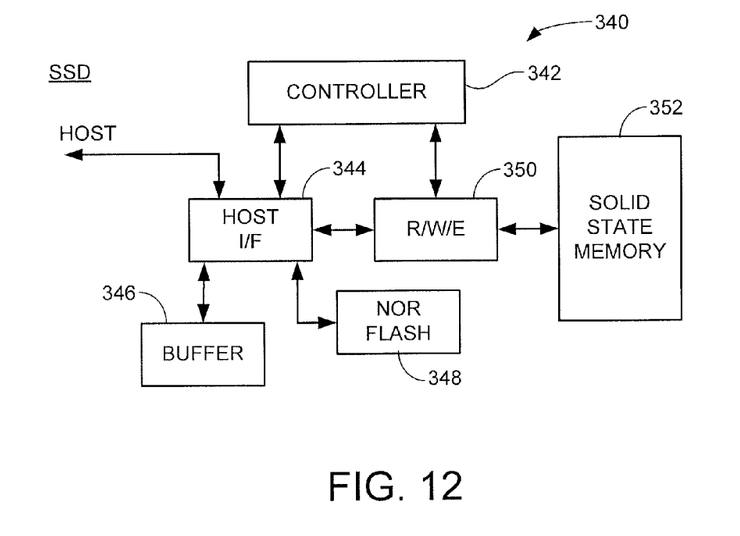
FIG. 12 shows a functional block representation of the storage device of FIG. 1 characterized as a solid state drive (SSD).

FIG. 12 depicts a failed device 340 characterized as a solid state drive (SSD). that uses solid-state memory to store user data from the host device 112. The solid-state memory can take a variety of forms, including but not limited to electronically erasable memory such as flash memory and electrically erasable, electrically programmable random access memory (EEPROM) and rewriteable non-volatile memory such as STRAM, RRAM, MRAM, PCRAM, FeRAM, etc.

The SSD 340 as depicted in FIG. 12 includes a top level controller 342 which, as before, may be realized in hardware, software and/or firmware. A host I/F 344 communicates with the host using the same or different protocol as in FIG. 11. A buffer memory 346 provides local volatile and/or non-volatile memory during data transfer operations.

Local memory such as in the form of a NOR flash module 348 can be used for the storage of control data for the SSD 340. A read/write/erase (R/W/E) circuit 350 performs appropriate encoding/decoding operations during write and read operations to one or more solid state memory arrays 352.

Suitable diagnostics accessed in accordance with the present disclosure for the SSD 340 may include various tests of the solid state array 352, channel 350 and controller/array interface. Read and write tests, margin adjustments, etc. can be incorporated into the testing protocol.

As mentioned above, the protected functionality used during the diagnostic testing is broadly defined as substantially any type of functionality of the storage device for which access control is desired, including but not limited to diagnostic routines, factory settings, specially configured data stored on the device, device firmware and associated control information, security information and components, specially designated memory locations, etc.

It will be understood that the various embodiments disclosed herein can provide a number of benefits. A self-contained, highly secure control system is provided in which a unique device credential can be generated and used for each data storage device in a population of similar devices without the need to maintain a large database of such credentials. The credential for a given device can be quickly and reliably recreated on demand as required. Secret keys and other security elements can be maintained in a confidential and secure state without being accessible to an attacking party or process. Depending on the configuration of the system, any number of suitable diagnostics can be implemented to perform in situ evaluation of failed devices based on a secure authentication process.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. For example, the particular elements may vary depending on the particular application without departing from the spirit and scope of the present technology.

What is claimed is:

1. A computer-implemented method comprising:
    detecting an error condition associated with a selected data storage device in a multi-device user environment comprising a plurality of data storage devices coupled to form a combined memory space;
    replicating, in a memory of an available replacement data storage device in the multi-device user environment, a data content stored in a memory of the selected data storage device;
    establishing a first level of user authentication by providing a first challenge value generated by the selected data storage device to a remote device over a network associated with the selected data storage device;
    executing a first diagnostic tool stored on the selected data storage device responsive to receipt of the first level of user authentication;
    establishing a second level of user authentication using an output from the first diagnostic tool and a second challenge value generated by the selected data storage device; and
    executing a second diagnostic tool stored on the selected data storage device responsive to the second level of user authentication, the establishment of the first and second levels of user authentication and the execution of the first and second diagnostic tools carried out while the selected data storage device remains operably and physically connected in the multi-device user environment.

2. The method of claim 1, wherein the first level of user authentication is further established by requesting the first challenge value from the selected data storage device, forwarding the first challenge value to a remote device which encrypts the first challenge value to generate a first encrypted challenge value, transmitting the first encrypted challenge value to the selected data storage device, applying a cryptographic operation at the selected data storage device to generate a second encrypted challenge value, and comparing the transmitted first encrypted challenge value to the second encrypted challenge value.

3. The method of claim 1, wherein the step of establishing a first level of user authentication further comprises:
    combining a plurality of identification (ID) values associated with the selected data storage device to form a combined ID value;
    encrypting the combined ID value using a secret symmetric encryption key and a selected encryption algorithm to generate a unique device credential for the selected data storage device; and
    using the unique device credential as an input to a selected cryptographic function to control access to the first diagnostic tool.

4. The method of claim 3, wherein the plurality of unique ID values include at least a selected one of a model number, a serial number, a data capacity, a component serial number or a performance parameter of the selected data storage device.

5. The method of claim 1, wherein at least a selected one of the first or second challenge value is a multi-bit random sequence generated by the selected data storage device.

6. The method of claim 5, wherein at least a selected one of the first or second challenge value is encrypted by the selected data storage device.

7. The method of claim 1, wherein first and second diagnostic tools each comprise at least a selected one of a diagnostic routine, specially configured data stored on the selected data storage device, device firmware, control information, or security information associated with the selected data storage device.

8. The method of claim 1, wherein a host device connected to the selected data storage device obtains a plurality of ID values from the selected data storage device and communicates the same to a remote server over a network along with the first or second challenge value, in which the remote server returns a verification value to the host device and the host device forwards the verification value to the selected data storage device.

9. The method of claim 1, wherein the selected data storage device is characterized as a hard disc drive (HDD) having a rotatable data recording medium and a moveable data read/write transducer.

10. The method of claim 1, wherein the selected data storage device is characterized as a solid state drive (SSD) with a solid-state semiconductor memory array.

11. The method of claim 1, further comprising collecting metric data from the multi-device user environment associated with the selected data storage device and transmitting the metric data to a remote server over a network.

12. An apparatus comprising:
    a multi-device data storage array comprising a plurality of data storage devices which cooperate to form a combined memory space; and
    a host device that directs data transfers with the multi-device data storage array, the host device comprising a controller circuit with associated programming in memory adapted to detect an error condition associated with a selected data storage device in the multi-device data storage array, establish a first level of user authentication by providing a first challenge value generated by the data storage device to a remote device over a network associated with the data storage device, execute a first diagnostic tool stored on the data storage device responsive to receipt of the first level of user authentication, and establish a second level of user authentication by providing a second challenge value generated by the storage device to the remote device and an output from the first diagnostic tool to execute a second diagnostic tool stored on the data storage device, the controller circuit further adapted to reconstruct and transfer a data content stored in a memory of the selected data storage device to a memory of an available replacement data storage device in the multi-device data storage array responsive to the detected error condition, the authentication and execution of the first and second diagnostic tools carried out while the selected data storage device remains operably and physically connected in the multi-device data storage array.

13. The apparatus of claim 12, wherein at least a selected one of the first or second challenge value is a multi-bit random sequence generated by the selected data storage device.

14. The apparatus of claim 12, wherein at least a selected one of the first or second challenge value is encrypted by the selected data storage device.

15. The apparatus of claim 12, wherein first and second diagnostic tools each comprise at least a selected one of a diagnostic routine, specially configured data stored on the selected data storage device, device firmware, control information, or security information associated with the data storage device.

16. The apparatus of claim 12, wherein a host device connected to the selected data storage device obtains a plurality of ID values from the data storage device and communicates the same to a remote server over a network along with the requested challenge value, in which the remote server returns a verification value to the host device and the host device forwards the verification value to the data storage device.

17. The apparatus of claim 12, wherein the selected data storage device further operates to transmit metric data from the multi-device user environment associated with the selected data storage device to a remote server over a network.

18. A method comprising:
transferring data between a host device and a multi-device data storage array comprising a plurality of data storage devices which cooperate to form a combined memory space so that at least one user data set from the host device is distributed across multiple ones of the plurality of data storage devices;
detecting an error condition associated with a selected data storage device in the multi-device data storage array storing a portion of the at least one user data set;
replicating, in a memory of an available replacement data storage device in the multi-device data storage array, the portion of the at least one user data set stored in the selected data storage device;
executing at least one diagnostic tool stored on the selected data storage device responsive to receipt of a user authentication established by providing a challenge value generated by the selected data storage device to a remote device over a network associated with the selected data storage device, the establishment of the user authentication and the execution of the at least one diagnostic tool carried out while the selected data storage device remains operably and physically connected in the multi-device data storage array
wherein the executing step comprises:
establishing a first level of user authentication by providing a challenge value generated by the selected data storage device to a remote device over a network associated with the selected data storage device;
executing a first diagnostic tool stored on the selected data storage device responsive to receipt of the first level of user authentication;
establishing a second level of user authentication using an output from the first diagnostic tool and a second challenge value generated by the selected data storage device;
and executing a second diagnostic tool stored on the selected data storage device responsive to the second level of user authentication.

19. The method of claim 18, further comprising subsequently removing the selected data storage device from the multi-device data storage array responsive to the execution of the first and second diagnostic tools.

* * * * *